United States Patent
Kato

(10) Patent No.: US 10,537,810 B2
(45) Date of Patent: Jan. 21, 2020

(54) DATA COLLECTION DEVICE, GAME DEVICE, DATA COLLECTION SYSTEM, DATA COLLECTION METHOD, AND COMPUTER-READABLE RECORDING MEDIUM

(71) Applicant: NEC CORPORATION, Tokyo (JP)

(72) Inventor: Daishi Kato, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 111 days.

(21) Appl. No.: 15/568,010

(22) PCT Filed: Apr. 22, 2015

(86) PCT No.: PCT/JP2015/062281
§ 371 (c)(1),
(2) Date: Oct. 20, 2017

(87) PCT Pub. No.: WO2016/170627
PCT Pub. Date: Oct. 27, 2016

(65) Prior Publication Data
US 2018/0117473 A1    May 3, 2018

(51) Int. Cl.
| | |
|---|---|
| *A63F 9/24* | (2006.01) |
| *A63F 13/00* | (2014.01) |
| *G06F 17/00* | (2019.01) |
| *G06F 19/00* | (2018.01) |
| *A63F 13/79* | (2014.01) |

(Continued)

(52) U.S. Cl.
CPC .............. *A63F 13/79* (2014.09); *A63F 13/35* (2014.09); *A63F 13/49* (2014.09); *G06F 16/24578* (2019.01); *G06F 3/0482* (2013.01); *G06F 3/0486* (2013.01); *G06F 3/0488* (2013.01)

(58) Field of Classification Search
USPC .............................. 463/1, 20, 22, 39, 40, 42
See application file for complete search history.

(56) References Cited

U.S. PATENT DOCUMENTS

| | | | |
|---|---|---|---|
| 6,347,993 B1 * | 2/2002 | Kondo ................... | A63F 13/10 463/1 |
| 7,980,953 B2 | 7/2011 | Von Ahn Arellano | |

(Continued)

FOREIGN PATENT DOCUMENTS

| | | |
|---|---|---|
| JP | 2008-226061 A | 9/2008 |
| JP | 2011-076366 A | 4/2011 |
| JP | 2012-226698 A | 11/2012 |

OTHER PUBLICATIONS

"Google Image Labeler", Wikipedia, Apr. 9 2013, Apr. 1, 2015, 5 pages web: http://ja.wikipedia.org/wiki/Google_Image_Labeler.

(Continued)

*Primary Examiner* — Adetokunbo O Torimiro
(74) *Attorney, Agent, or Firm* — Sughrue Mion, PLLC

(57) ABSTRACT

A data collection device (20) includes: a collection unit (21) that collects game results from game devices (10) that are each used by a different one of a plurality of players when the game devices (10) of the plurality of players have executed a game that allows each player to associate a topic with a prepared description by performing an operation via a graphical interface; and a data analysis unit (22) that applies statistical processing to the collected game results.

9 Claims, 13 Drawing Sheets

(51) Int. Cl.
*G06F 16/2457* (2019.01)
*A63F 13/35* (2014.01)
*A63F 13/49* (2014.01)
G06F 3/0482 (2013.01)
G06F 3/0486 (2013.01)
G06F 3/0488 (2013.01)

(56) References Cited

U.S. PATENT DOCUMENTS

| | | | |
|---|---|---|---|
| 8,196,198 B1 | 6/2012 | Eger | |
| 8,606,745 B1 * | 12/2013 | Haveliwala | G06Q 30/02 706/20 |
| 2009/0049077 A1 * | 2/2009 | Lawlor | G09B 5/00 |
| 2010/0178985 A1 | 7/2010 | Chickering et al. | |

OTHER PUBLICATIONS

International Search Report for PCT/JP2015/062281 dated Jun. 9, 2015 [PCT/ISA/210].

* cited by examiner

DATA COLLECTION DEVICE, GAME DEVICE, DATA COLLECTION SYSTEM, DATA COLLECTION METHOD, AND COMPUTER-READABLE RECORDING MEDIUM

CROSS REFERENCE TO RELATED APPLICATIONS

This application is a National Stage of International Application No. PCT/JP2015/062281 filed Apr. 22, 2015, the contents of all of which are incorporated herein by reference in their entirety.

TECHNICAL HELD

The present invention relates to a data collection device that collects descriptions of specific topics as data, a data collection system, a game device, and a data collection method, and to a computer-readable recording medium having recorded therein a program for realizing these devices, system, and method.

BACKGROUND ART

In order to realize an image search on the Internet, it is necessary to associate each image with a description that describes the image. However, as an enormous number of images exist on the Internet, it is extremely difficult to manually associate each image with a description.

In view of this, Google Inc. provides a service called "Google Image Labeler," which allows many users to play a game of matching a specific image to a description, and obtains a description that describes the specific image using the game results (see, for example, Non-Patent Document 1).

Specifically, this game presents the same image to two players, asks the players to input as many descriptions as possible that appropriately describe the image, and gives a score to both players when the players' descriptions match (see, for example, Patent Document 1). The more each player plays the game to earn a high score, the larger the number of images associated with descriptions, and the higher the precision of an image search.

LIST OF PRIOR ART DOCUMENTS

Patent Document

Patent Document 1: U.S. Pat. No. 7,980,953, Specification

Non Patent Document

Non-Patent Document 1: "Google Image Labeler." *Wikipedia*. 9 Apr. 2013. Web. 1 Apr. 2015. <http://ja.wikipedia.org/wiki/Google_Image_Labeler>.

DISCLOSURE OF THE INVENTION

Problems to be Solved by the Invention

Google Image Labeler requires players to input descriptions by typing. Therefore, especially when the players use touchscreen terminals, such as smartphones, as input devices, the players may find it burdensome to perform the input.

An example of an object of the present invention is to solve the foregoing issue by providing a data collection device, a game device, a data collection system, a data collection method, and a computer-readable recording medium that can reduce an input burden on a player when data is collected via a game on a network.

Means for Solving the Problems

In order to achieve the foregoing object, a data collection device according to one aspect of the present invention includes: a collection unit that collects game results from game devices that are each used by a different one of a plurality of players when the game devices of the plurality of players have executed a game that allows each player to associate a topic with a prepared description by performing an operation via a graphical interface; and a data analysis unit that applies statistical processing to the collected game results.

In order to achieve the foregoing object, a game device according to another aspect of the present invention includes: an operation accepting unit that accepts an operation performed by a player via a graphical interface; and a program execution unit that executes a game program that, in response to the operation accepted by the operation accepting unit, associates a topic with one or all of two or more prepared descriptions.

In order to achieve the foregoing object, a data collection system according to still another aspect of the present invention includes a game device and a data collection device. The game device includes: an operation accepting unit that accepts an operation performed by a player via a graphical interface; and a program execution unit that executes a game program that, in response to the operation accepted by the operation accepting unit, associates a topic with one or all of two or more prepared descriptions. The data collection device includes: a collection unit that collects a game result from the game device; and a data analysis unit that applies statistical processing to the collected game result.

In order to achieve the foregoing object, a data collection method according to still another aspect of the present invention includes: (a) a step of, on a game device, accepting an operation performed by a player via a graphical interface; (b) a step of, on the game device, executing a game program that, in response to the operation accepted in step (a), associates a topic with one or all of two or more prepared descriptions; (c) a step of, on a data collection device, collecting a game result from the game device; and (d) a step of, on the data collection device, applying statistical processing to the game result collected in step (c).

In order to achieve the foregoing object, a first computer-readable recording medium according to still another aspect of the present invention has recorded therein a program including an instruction that causes a computer to execute: (a) a step of collecting game results from game devices that are each used by a different one of a plurality of players when the game devices of the plurality of players have executed a game that allows each player to associate a topic with a prepared description by performing an operation via a graphical interface; and (h) a step of applying statistical processing to the game results collected in step (a).

In order to achieve the foregoing object, a second computer-readable recording medium according to still another aspect of the present invention has recorded therein a program including an instruction that causes a computer to execute: (a) a step of accepting an operation performed by a player via a graphical interface; and (b) a step of executing a game program that, in response to the operation accepted in step (a), associates a topic with one or all of two or more prepared descriptions.

Advantageous Effects of the Invention

As described above, the present invention can reduce an input burden on a player when data is collected via a game on a network.

MODE FOR CARRYING OUT THE INVENTION

First Embodiment

With reference to FIGS. 1 to 5, the following describes a data collection device, a game device, a data collection system, a data collection method, and programs according to a first embodiment of the present invention.

[Device Configurations]

Figure 1:
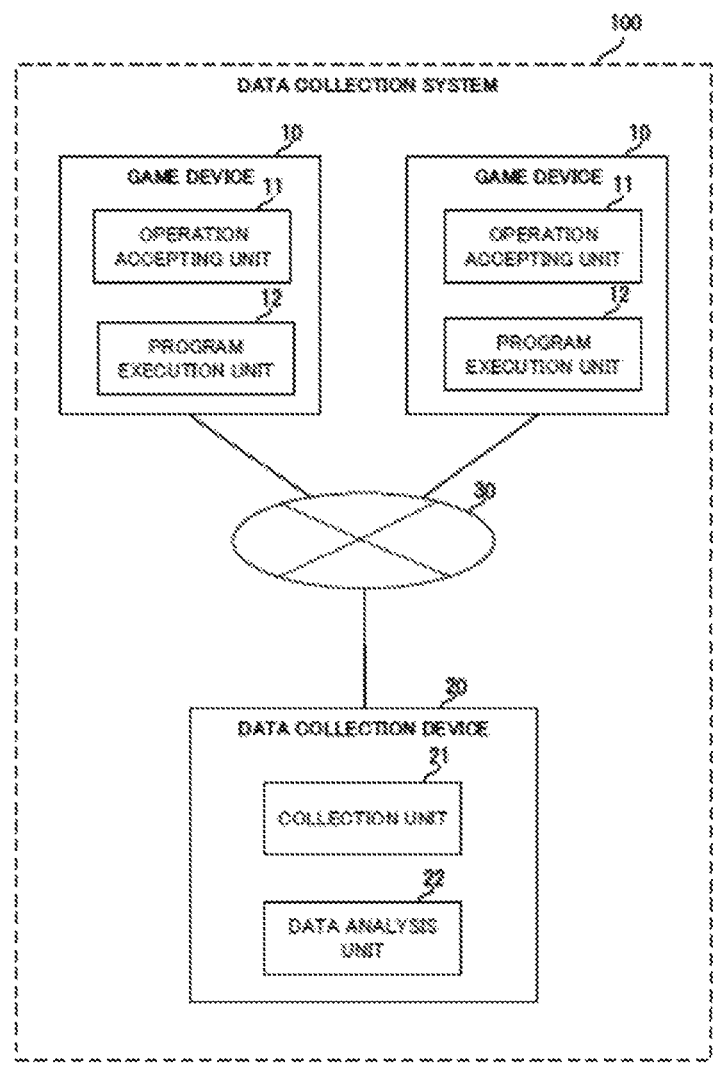
FIG. 1 is a block diagram showing schematic configurations of a data collection device, a game device, and a data collection system according to a first embodiment of the present invention.

First, schematic configurations of the data collection device, the game device, and the data collection system according to the present first embodiment will be described using FIG. 1. FIG. 1 is a block diagram showing the schematic configurations of the data collection device, the game device, and the data collection system according to the first embodiment of the present invention.

As shown in FIG. 1, a data collection system 100 according to the present first embodiment includes game devices 10 and a data collection device 20. In the present first embodiment, the game devices 10 and the data collection device 20 are connected via a network 30. Although only two game devices 10 are shown in the example of FIG. 1, the number of the game devices 10 is not limited to a particular number in the present first embodiment.

Each game device 10 includes an operation accepting unit 11 that accepts operations performed by a player via a graphical interface (GUI), and a program execution unit 12 that executes a game program. In the game devices 10, when the game program is in execution, a topic is associated with one or all of two or more prepared descriptions by an operation accepted by a player.

On the other hand, the data collection device 20 includes a collection unit 21 and a data analysis unit 22 as shown in FIG. 1. The collection unit 21 collects the game results from the game devices 10. The data analysis unit 22 applies statistical processing to the collected game results.

In this way, in the present first embodiment, a player can associate a topic with a description(s) only by intuitively performing an operation via a GUI during a game. Therefore, the present first embodiment can reduce an input burden on a player when data is collected via a game on a network.

Figure 2:
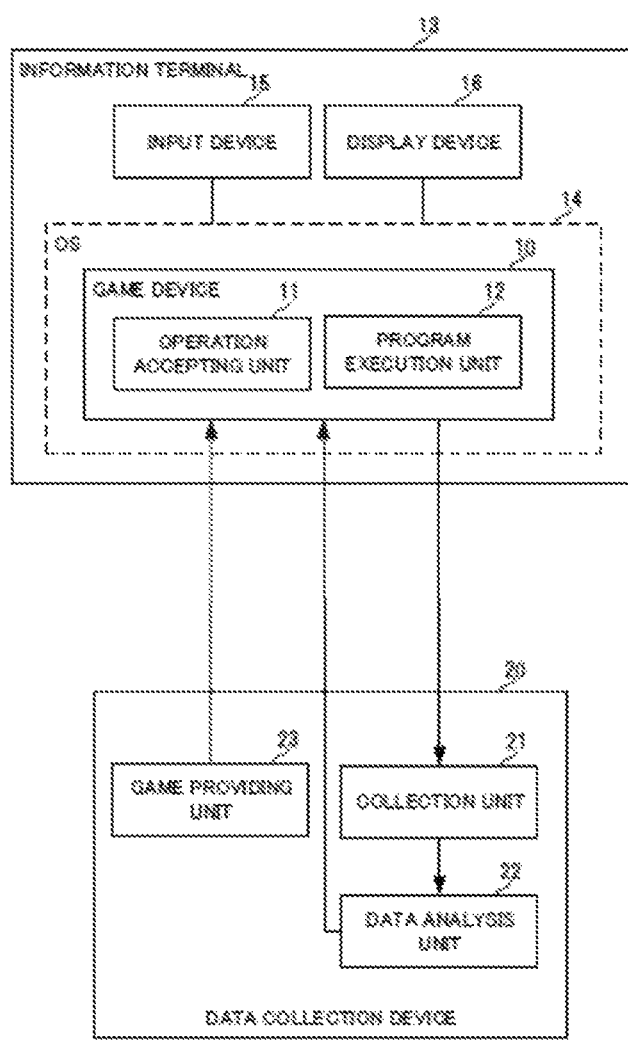
FIG. 2 is a block diagram showing specific configurations of the data collection device, the game device, and the data collection system according to the first embodiment of the present invention.

Next, the configurations of the data collection device, the game device, and the data collection system according to the present first embodiment will be described in more detail using FIG. 2. FIG. 2 is a block diagram showing specific configurations of the data collection device, the game device, and the data collection system according to the first embodiment of the present invention.

As shown in FIG. 2, in the present first embodiment, the game device 10 is provided inside an information terminal 13, examples of which include a smartphone and a tablet terminal. Specifically, the game device 10 is realized by configuring its components, namely, the operation accepting unit 11 and the program execution unit 12 in the form of a program on an operating system (OS) 14 installed in the information terminal 13. Note that only one game device 10 is shown in the example of FIG. 2 for the sake of explanation.

The information terminal 13 includes a display device 16 and an input device 15, which are, for example, a liquid crystal display panel and a touchscreen, respectively. Therefore, in the game device 10, the operation accepting unit 11 provides a GUI-based operation screen (see later-described FIG. 3) on a screen of the display device 16. When a player performs an operation on the Operation screen using the input device 15, the operation accepting unit 11 accepts the operation.

As shown in FIG. 2, in the present embodiment, e data collection device 20 further includes a game providing unit 23 that provides a game to the game device 10 of each player. Specifically, the game providing unit 23 transmits a game program for executing the game to the game device 10 via the network 30 (see FIG. 1).

The transmitted game program may be a web application executed on a web browser installed in the information terminal 13, or may be a native application installed in the OS 14 of the information terminal 13. In the former case, the web browser installed in the information terminal 13 functions as the program execution unit 12.

In the present first embodiment, the game provided by the game providing unit 23 allows a player to select a description(s) to be associated with a topic from among a plurality of prepared descriptions. The content of the game will be described later using FIG. 3.

In the statistical processing according to the present first embodiment, the data analysis unit 22 calculates a reliability degree that indicates, in the form of a numeric value, how reliably a description describes a topic based on the game results. More specifically, the data analysis unit 22 calculates the reliability degree of the description so that the larger the number of times the description was selected for the topic, that is to say, the larger the number of players who selected the description for the topic, the larger the value of the reliability degree. In other words, a "reliability degree" is not obtained from a game result of one player, but is obtained from the game results of a plurality of players.

Furthermore, for each game device 10, the data analysis unit 22 can compare a game result from the game device 10 with a game result from another game device 10, and calculate a score that has a larger value as the former game result has more in common with the latter game result. In this case, the data analysis unit 22 transmits the calculated scores to the game devices 10. In this case, the motivations of the players are increased, and the players play the game many times to achieve a high score. Thus, a larger amount of data can be collected.

Figure 3:
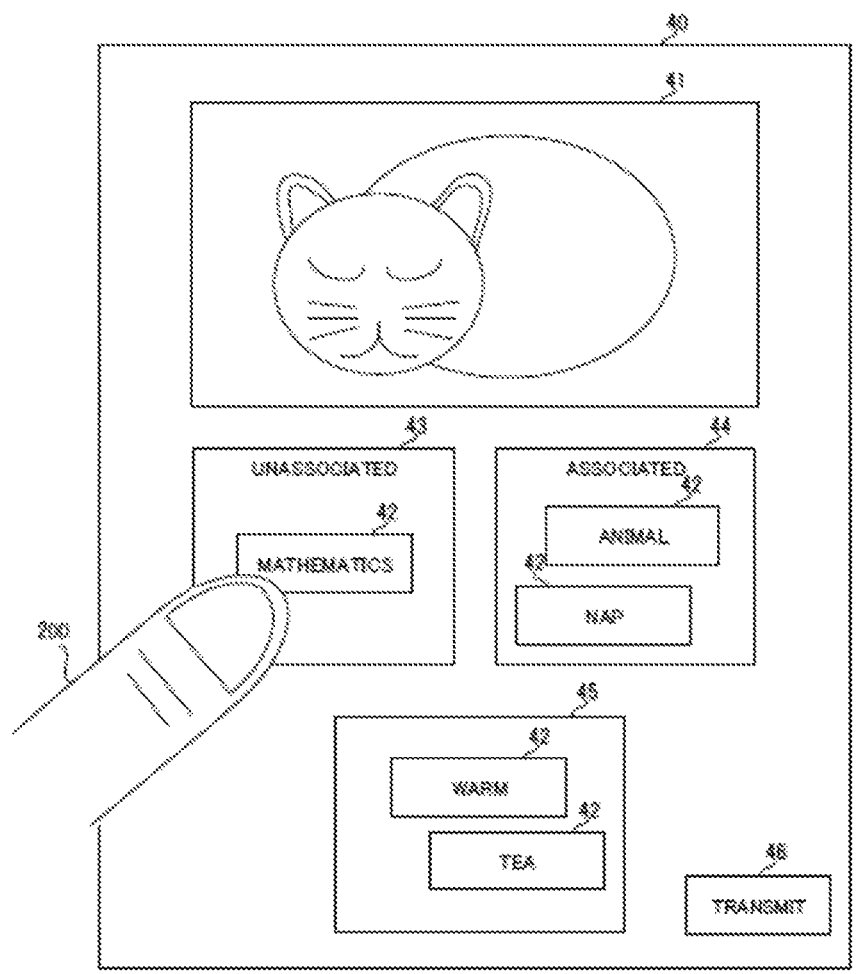
FIG. 3 shows an example of an operation screen of a game used in the first embodiment of the present invention.

Using FIG. 3, the following provides a specific description of the game executed in the present embodiment. FIG. 3 shows an example of an operation screen of the game used in the first embodiment of the present invention. As shown in FIG. 3, when the game program is in execution, a display screen 40 of the game device 10 displays a topic 41, a plurality of prepared descriptions 42, and a transmission button 46. In the example of FIG. 3, the topic 41 is an image of a cat.

A player 200 first touches one of the descriptions 42 in a region 45 on the screen with his/her finger. Then, based on an intuitive judgment, the player 200 drags the touched description 42 to a region 43 where descriptions that are not to be associated with the topic 41 are placed, or a region 44 where descriptions to be associated with the topic 41 are placed. Upon completion of the drag operation, the player 200 taps the transmission button 46. As a result, the game ends. At this time, a part of the descriptions 42 may remain in the region 45.

The descriptions 42 that are present in the region 44 at the end of the game are the descriptions that have been selected by the player 200 to be associated with the topic 41. On the other hand, the descriptions 42 that are present in the region 43 at the end of the game are the descriptions that the player 200 has excluded from the topic 41, and the descriptions 42 that are present in the region 45 at the end of the game are the descriptions that have not been selected by the player 200 in association with the topic 41, The program execution unit 12 of the game device 10 generates a list of the descriptions 42 that are present in the region 44 at the end of the game, and transmits the generated list to the data collection device 20. The program execution unit 12 also measures a list of the descriptions that are present in the region 43 and a list of the descriptions that are present in the region 45 at the end of the game, and transmits these lists to the data collection device 20.

In this case, in the data collection device 20, the collection unit 21 collects the transmitted lists as a game result. Then, based on the game results collected from the players, the data analysis unit 22 calculates a reliability degree of each description. A specific example of processing for calculating a reliability degree will be explained below.

For example, based on the list of the descriptions 42 present in the region 44, the data analysis unit 22 first specifies, for each description, the number of times the description 42 was present in the region 44 as the number of times it was selected by the players. Based on the list of the descriptions 42 present in the region 43, the data analysis unit 22 also specifies, for each description 42, the number of times the description 42 was present in the region 43 as the number of times it was excluded by the players. Based on the list of the descriptions 42 present in the region 45, the data analysis unit 22 also specifies, for each description 42, the number of times the description 42 was present in the region 45 as the number of times it was unselected by the players.

Subsequently, for each description 42, the data analysis unit 22 performs normalization so that each specified number is "1" at most, and multiplies each normalized number by a corresponding weighting coefficient. After normalization and multiplication by the weighting coefficient, for each description 42, the data analysis unit 22 subtracts the number of times it was excluded by the players and the number of times it was unselected by the players from the number of times it was selected by the players, and uses a value obtained through the subtraction as a reliability degree of the description 42. The data analysis unit 22 judges that a description with a reliability degree equal to or higher than a set value appropriately describes a topic.

When evaluations are given to the players, the data analysis unit 22 can calculate reliability degrees using only the game results collected from players who are given evaluations of a certain level or higher. This mode adds value to reliability degrees.

In the example of FIG. 3, for each game device 10, the data analysis unit 12 further compares the lists transmitted by the game device 10 with the lists transmitted by another game device 10, and calculates a score that has a larger value as the former lists have more in common with the latter lists. The data analysis unit 22 then transmits the calculated scores to the game devices 10.

[Device Operations]

Figure 4:
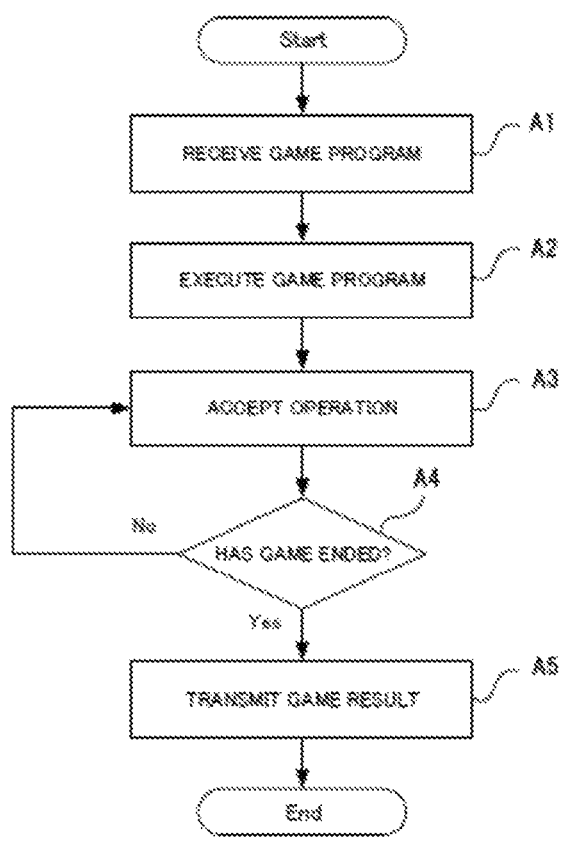
FIG. 4 is a flowchart showing the operations of the game device according to the first embodiment of the present invention.

The following describes the operations of the data collection device, the game device, and the data collection system according to the present first embodiment. In the following description, FIGS. 1 to 3 will be referred to as appropriate. In the present first embodiment, the data collection method is implemented by causing the data collection system to operate. Therefore, the following description of the operations of the data collection system 100 applies to the data collection method according to the present first embodiment, First, the operations of the game device 10 according to the present first embodiment will be described using FIG. 4. FIG. 4 is a flowchart showing the operations of the game device according to the first embodiment of the present invention. As shown in FIG. 4, first, the game device 10 receives a game program transmitted by the data collection device 20 (step A1).

Next, in the game device 10, the program execution unit 12 executes the game program received in step A1 (step A2). Once step A2 has been executed, the display screen 40 of the display device 16 displays, for example, the topic 41 and the plurality of prepared descriptions 42 as shown in FIG. 3.

Next, when the player 200 performs an operation on the operation screen using the input device 15, the operation accepting unit 11 accepts the operation (step A3). Specifically, as shown in FIG. 3, when the player 200 drags a touched description 42 to the region 43 or the region 44 based on an intuitive judgment, the operation accepting unit 11 accepts the performed operation.

Next, the program execution unit 12 determines whether the game has ended, specifically, whether the player has tapped the transmission button 46 (step A4). If the program execution unit 12 determines that the game has not ended in step A4, it executes step A3 again.

On the other hand, if the program execution unit 12 determines that the game has ended in step A4, it transmits a game result to the data collection device 20 (step A5). Specifically, in the example of FIG. 3, step A5 is as follows: the program execution unit 12 generates, for each of the regions 43 to 45, a list of the descriptions 42 that are present in the area, and transmits the generated lists as a game result to the data collection device 20.

Once step A5 has been executed, processing of the game device 10 ends. As steps A1 to A5 are executed in each game device 10, the game results obtained in the plurality of game devices 10 are transmitted to the data collection device 20.

Figure 5:
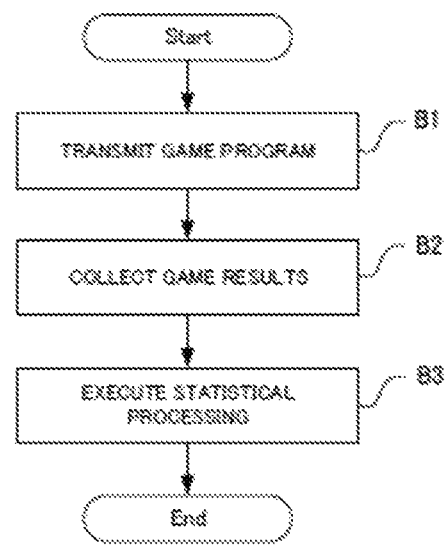
FIG. 5 is a flowchart showing the operations of a data collection device 20 according to the first embodiment of the present invention.

Next, the operations of the data collection device 20 according to the present first embodiment will be described using FIG. 5. FIG. 5 is a flowchart showing the operations of the data collection device 20 according to the first embodiment of the present invention.

As shown in FIG. 5, first, in the data collection device 20, the game providing unit 23 transmits a game program to each game device 10 (step B1). After step B1 is executed, steps A1 to A5 shown in FIG. 4 are executed in each game device 10.

Next, the collection unit 21 receives the game results transmitted by the game devices 10 (step 132). Specifically, the collection unit 21 collects measurement results that were transmitted by the game devices 10 in step A5 as the game results.

Next, the data analysis unit 22 executes statistical processing based on the game results received in step B2 (step B3). Specifically, based on the game results received in step B2, the data analysis unit 22 calculates a reliability degree of each description 42.

Once step B3 has been executed, processing of the data collection device 20 ends. As a result, a user of the data collection device 20 can specify a description that appropriately describes a topic based on the reliability degrees obtained in step B3.

[Programs]

It is sufficient for a first program according to the present embodiment to cause a computer to execute steps A1 to A5 shown in FIG. 4. The game device 10 according to the present embodiment can be realized by installing this program in the computer and executing the installed program. In this case, a central processing unit (CPU) of the computer functions as the operation accepting unit 11 and the program execution unit 12, and executes processing.

It is sufficient for a second program according to the present embodiment to cause a computer to execute steps BI to 133 shown in FIG. 5. The data collection device 20 according to the present embodiment can be realized by installing this program in the computer and executing the installed program. In this case, a central processing unit (CPU) of the computer functions as the collection unit 21, the data analysis unit 22, and the game providing unit 23, and executes processing.

[Advantageous Effects of First Embodiment]

As described above, in the present first embodiment, the player 200 can associate a topic with a description(s) only by intuitively performing an operation via a GUI during a game without inputting text that is indicative of the description(s). Specifically, it is sufficient for the player 200 to only drag the description(s) to be associated with the topic to the predetermined region 44. The present first embodiment can reduce an input burden on the player 200 when data is collected via a game on a network.

In the present first embodiment, a "topic" is not limited to an image, and may be a product name, music, a video, and so forth, Specifying a description(s) that appropriately describes a topic is effective in, for example, product marketing, a search related to the topic, and so forth.

Second Embodiment

The following describes a data collection device, a game device, a data collection system, a data collection method, and programs according to a second embodiment of the present invention.

The present second embodiment is similar to the first embodiment in the configurations of the data collection device, the game device, and the data collection system, but is different from the first embodiment in the content of a game provided by the data collection device and the content of statistical processing of a data analysis unit.

Figure 6:
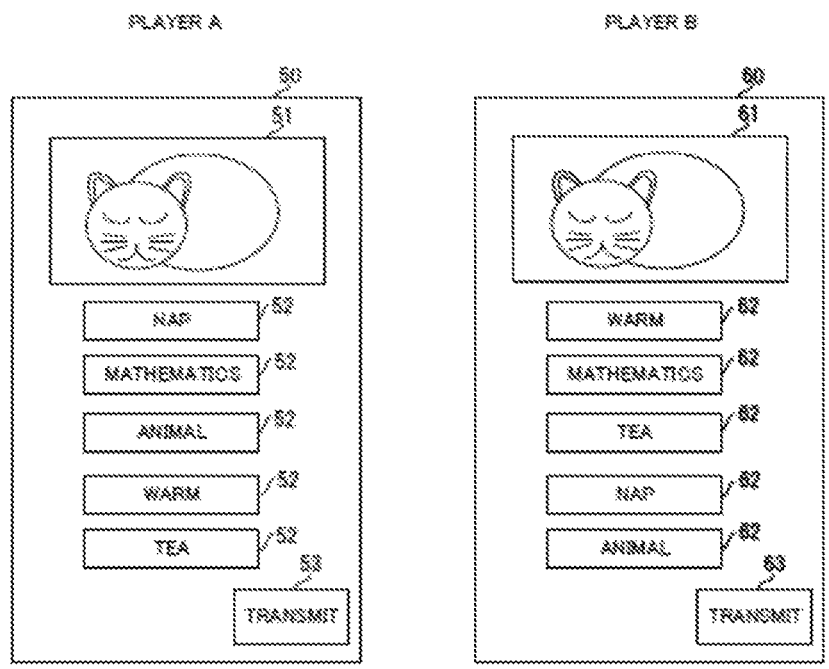
FIG. 6 shows an example of a screen displayed at the start of a game used in a second embodiment of the present invention.
Figure 7:
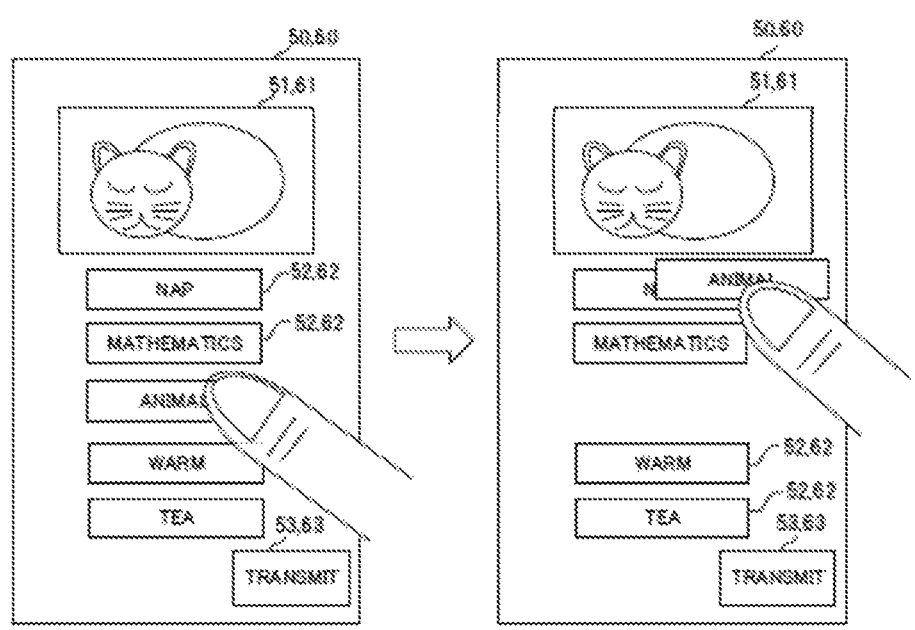
FIG. 7 shows an input operation performed by a player during the game used in the second embodiment of the present invention.
Figure 8:
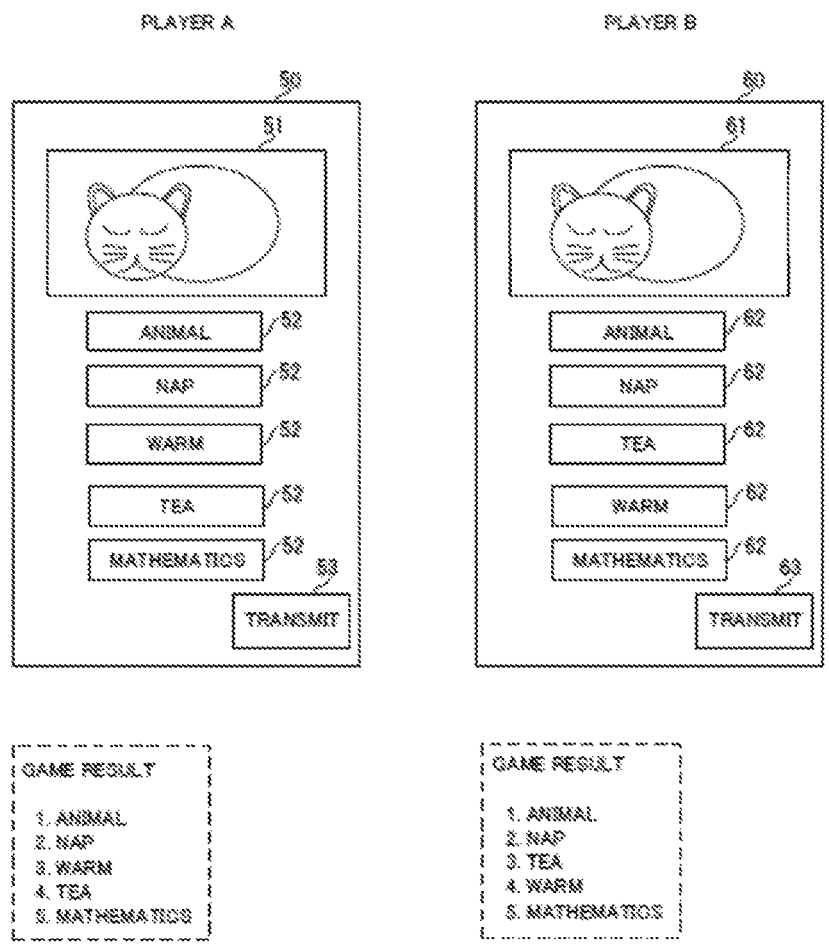
FIG. 8 shows examples of screens displayed at the end of the game used in the second embodiment of the present invention.

The following description focuses on differences between the present second embodiment and the first embodiment using FIGS. 6 to 8. FIG. 6 shows examples of screens displayed at the start of a game used in the second embodiment of the present invention. FIG. 7 shows an input operation performed by a player during the game used in the second embodiment of the present invention. FIG. 8 shows examples of screens displayed at the end of the game used in the second embodiment of the present invention.

Unlike the first embodiment, a game providing unit according to the present second embodiment first provides, to game devices that are each used by a different one of two or more players, a game that allows each player to select a description to be associated with the same topic from among a plurality of prepared descriptions by assigning ranks to the plurality of prepared descriptions.

Specifically, in the examples of FIGS. 6 to 8, a game program is executed in each of a game device of a player A and a game device of a player B. As a result, as shown in FIG. 6, a display screen 50 of the game device of the player A displays a topic 51, a plurality of prepared descriptions 52, and a transmission button 53. Similarly, a display screen 60 of the game device of the player B displays a topic 61, a plurality of prepared descriptions 62, and a transmission button 63.

The topic 51 and the topic 61 are the same image. The descriptions 52 displayed on the display screen 50 are the same as the descriptions 62 displayed on the display screen 60. It is preferable that the order of the descriptions displayed on the display screen 50 be different from the order of the descriptions displayed on the display screen 60. As will be described later, this difference between the orders is to prevent each player from guessing an operation performed by his/her partner player when the status of the partner player is displayed in silhouette.

As shown in FIG. 7, each player touches one of the descriptions 52 (or 62) on the screen with his/her finger. Then, based on an intuitive judgment, each player changes the rank of the touched descriptions 52 (or 62) by dragging the touched description 52 (or 62), Specifically, in the example of FIG. 7, the player moves the description 52 (or 62) that is placed third from the top to the topmost position, thereby changing its rank to first.

At this time, each player can also delete any description that is not appropriate. Furthermore, when the game devices can communicate with one another, each display screen can display the status of the ranks changed by another player in silhouette, In this case, as each player imagines the action of another player, he/she may find the game more enjoyable.

Thereafter, upon completion of the change in the ranks of the descriptions 52 (or 62) as shown in FIG. 8, each player taps the transmission button 53 (or 63). As a result, the game ends. Then, each program execution unit specifies the ranks of the descriptions at the end of the game, and transmits the specified ranks of the descriptions to the data collection device.

Once each game device has transmitted the ranks of the descriptions, a collection unit of the data collection device collects the ranks of the descriptions in each game device as a game result. Then, the data analysis unit according to the present second embodiment calculates a reliability degree of each description by comparing the descriptions 52 selected by the player A and their ranks with the descriptions 62 selected by the player B and their ranks.

Specifically, the data analysis unit specifies a description selected by both players, obtains an average rank of the specified description, and calculates a reliability degree of the specified description so that the higher the average rank of the specified description, the larger the value of the reliability degree. For example, when both players have selected the same description as a description of the highest rank, this description has the highest reliability degree.

Furthermore, in the examples of FIGS. 6 and 7, the data analysis unit compares the ranks of the descriptions 52 determined by the player A with the ranks of the descriptions 62 determined by the player B, and calculates, for each player (each game device), a score that has a lamer value as the ranks determined by him/her have more in common with the ranks determined by the other player. The data analysis unit 22 then transmits the calculated scores to the game devices of the players. In the present second embodiment also, the scores are thus calculated to increase the motivation of each player.

As described above, in the present second embodiment also, each player can associate a topic with a description(s) only by intuitively performing an operation via a GUI during a game without inputting text that is indicative of the description(s). With the use of the present second embodiment, an input burden on each player 200 can be reduced when data is collected via a game on a network, similarly to the first embodiment. Although there are two players in the foregoing examples, the number of players is not limited to a particular number, and there may be three or more players in the present second embodiment.

in the present second embodiment also, the data collection method is implemented by causing the foregoing data collection system to operate. Furthermore, in the present second embodiment also, the game devices execute steps A1 to A5 shown in FIG. 4. Therefore, it is sufficient for a first program that realizes the game devices to cause a computer to execute steps A1 to A5. Furthermore, in the present second embodiment also, the data collection device executes steps B1 to B3 shown in FIG. 5. Therefore, it is sufficient for a second program that realizes the data collection device to cause a computer to execute steps B1 to B3.

Third Embodiment

The following describes a data collection device, a game device, a data collection system, a data collection method, and programs according to a third embodiment of the present invention.

The present third embodiment is similar to the first embodiment in the configurations of the data collection device, the game device, and the data collection system, but is different from the first embodiment in the content of a game provided by the data collection device and the content of statistical processing of a data analysis unit.

Figure 9:
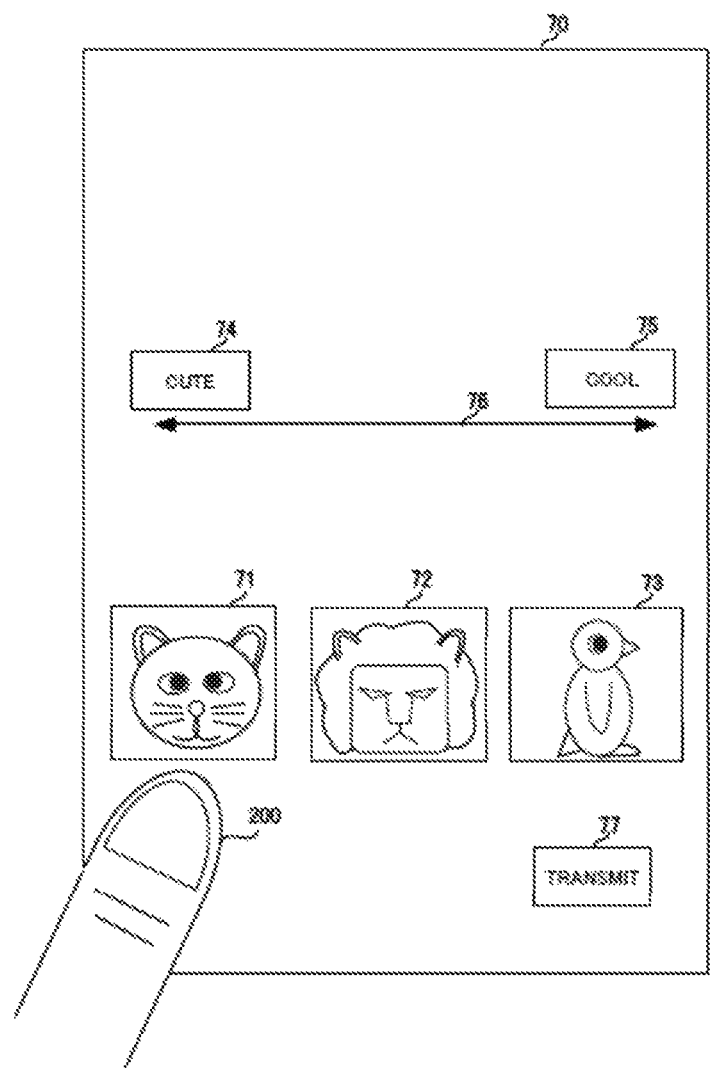
FIG. 9 shows an example of a screen displayed at the start of a game used in a third embodiment of the present invention.
Figure 10:
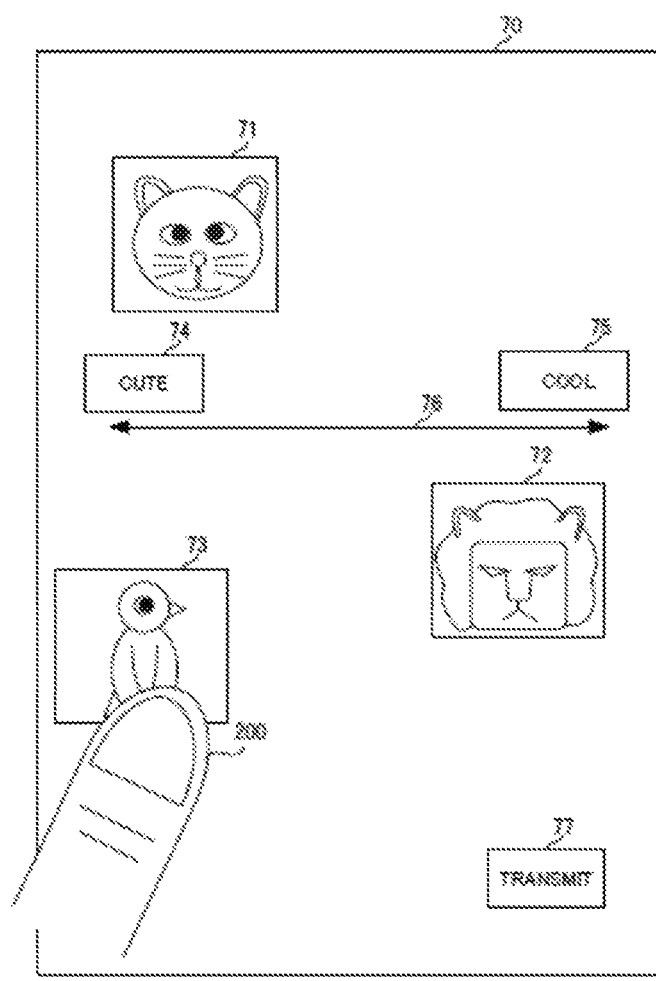
FIG. 10 shows an input operation performed by a player during the game used in the third embodiment of the present invention.
Figure 11:
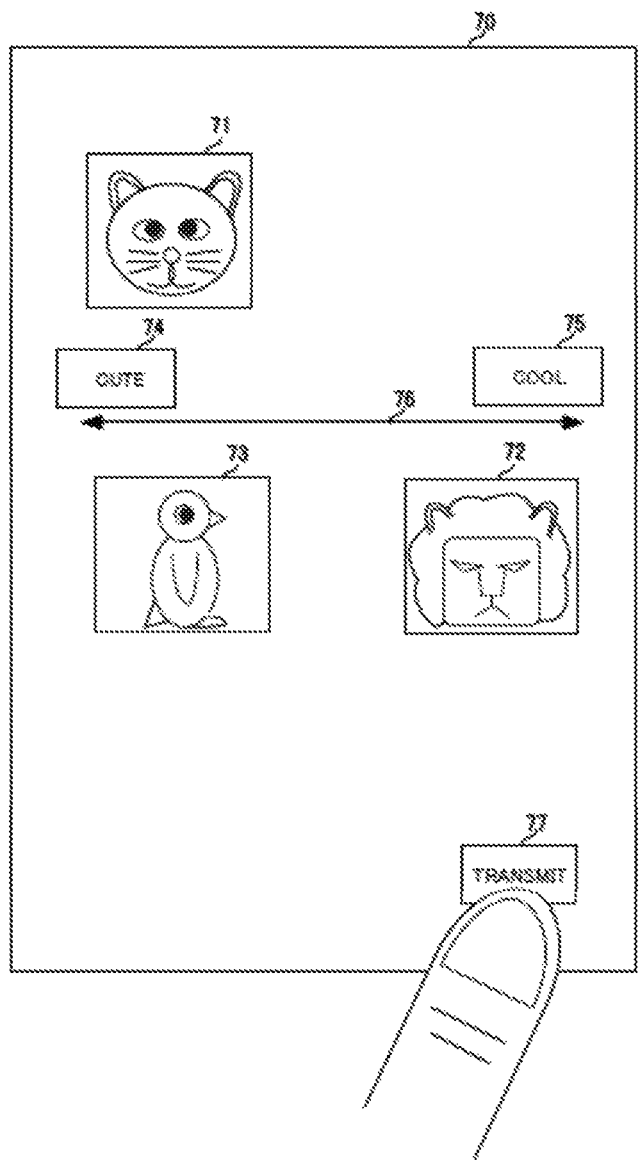
FIG. 11 shows an example of a screen displayed at the end of the game used in the third embodiment of the present invention.

The following description focuses on differences between the present third embodiment and the first embodiment using FIGS. 9 to 11. FIG. 9 shows an example of a screen displayed at the start of a game used in the third embodiment of the present invention. FIG. 10 shows an input operation performed by a player during the game used in the third embodiment of the present invention. FIG. 11 shows an example of a screen displayed at the end of the game used in the third embodiment of the present invention.

Unlike the first embodiment, a game providing unit according to the present third embodiment first provides a game that allows a player to position at least one of a topic and a description on a screen, and associate the topic with the description in accordance with a positional relationship between the positioned topic and description.

As shown in FIG. 9, a display screen 70 displays a description 74 and a description 75 at opposing positions in advance. The display screen 70 also displays a bar 76, which extends from the description 74 to the description 75 and has arrows at opposite ends, and a transmission button 77. The game starts in this state. Then, as shown in FIG. 10, a player 200 drags each of topics 71 to 73 to a position that he/she thinks is appropriate between the description 74 and the description 75.

Specifically, as shown in FIGS. 9 and 10, "cute" and "cool" are displayed as the descriptions 74 and 75, respectively. These descriptions 74 and 75 have opposite meanings. The topic 71 is an image of a cat, the topic 72 is an image of a lion, and the topic 73 is an image of a penguin. The player 200 arranges each topic between the descriptions in consideration of which one of "cute" and "cool" better suits the topic.

Thereafter, upon completion of positioning of the topics 71 to 73, the player taps the transmission button 77 as shown in FIG. 11. As a result, the game ends. Then, a program execution unit specifies the positions of the topics at the end of the game. In this manner, the player associates each topic with a description.

Specifically, for each topic, the program execution unit specifies a distance from the position of the center of mass of the topic to the description 74 (the arrow at the left side of the bar 76), as well as a distance from the position of the center of mass of the topic to the description 75 (the arrow at the right side of the bar 76), as the position of the topic, for example. The program execution unit then transmits the specified positions of the topics (the result of association made by the player) to the data collection device.

Once each game device has transmitted the positions of the topics, a collection unit of the data collection device collects the positions of the topics as a game result. Then, for each topic, the data analysis unit calculates reliability degrees of descriptions in accordance with the distances between the topic and the descriptions based on the game results collected from the game devices, that is to say, based on the results of association made by a plurality of players.

For example, assume a case in which, after compiling the results from the game devices (the results of association made by the players) with respect to the topic 71 representing the image of the cat, an average ratio between the distance to "cute" and the distance to "cool" is 1:9. In this case, the data analysis unit calculates 0.9 as a reliability degree of "cute" for the topic 71, and calculates 0.1 as a reliability degree of "cool" for the topic 71. On the other hand, assume a case in which, after compiling the results from the game devices with respect to the topic 71 representing the image of the cat, an average ratio between the distance to "cute" and the distance to "cool" is 1:1. In this case, the data analysis unit calculates 0.5 as both a reliability degree of "cute" for the topic 71 and a reliability degree of "cool" for the topic 71.

In the examples of FIGS. 9 and 10, for each game device, the data analysis unit also compares the positions of the topics transmitted by the game device with the positions of the topics transmitted by another game device, and calculates a score that has a larger value as the former positions are more similar to the latter positions. The data analysis unit 22 then transmits the calculated scores to the game devices of the players. In the present third embodiment also, the scores are thus calculated to increase the motivation of each player.

As described above, in the present third embodiment also, a player can associate a topic with a description only by intuitively performing an operation via a GUI during a game without inputting text that is indicative of the description. With the use of the present third embodiment, an input burden on the player 200 can be reduced when data is collected via a game on a network, similarly to the first embodiment.

Furthermore, according to the present third embodiment, the player can indicate the magnitude of his/her emotion during the game. Therefore, the data collection device can quantitatively evaluate each topic.

For example, assume a case in which the player has simply associated a description "angry" with a topic representing an image of an angry face of a person. In this case, in the data collection device, it is difficult to determine whether the player has judged the person as very angry or slightly angry.

On the other hand, assume a case in which a player A has associated a description "angry" with a topic representing an image of an angry face of a person, whereas a player B has associated a description "considerably angry" with the same topic. In this case, in the data collection device, it is difficult to determine the extent to which the emotion of the player A and the emotion of the player B toward the topic match or differ.

In contrast, according to the present third embodiment, each player can indicate the extent of anger that he/she has judged with respect to the topic, and the data collection device can quantitatively evaluate the emotion of each player toward the topic. As a result, the relationship between a topic and a description is made clear, and a more appropriate reliability degree is obtained.

In the present third embodiment also, the data collection method is implemented by causing the foregoing data collection system to operate. Furthermore, in the present third embodiment also, the game devices execute steps A1 to A5 shown in FIG. 4. Therefore, it is sufficient for a first program that realizes the game devices to cause a computer to execute steps A1 to A5. Furthermore, in the present third embodiment also, the data collection device executes steps B1 to B3 shown in FIG. 5. Therefore, it is sufficient for a second program that realizes the data collection device to cause a computer to execute steps B1 to B3.

Although a topic and a description are associated with each other by positioning the topic in the examples shown in FIGS. 9 to 11, the present third embodiment is not limited to this mode. For example, the present third embodiment may adopt a mode in which a topic and a description are associated with each other by positioning the description.

Figure 12:
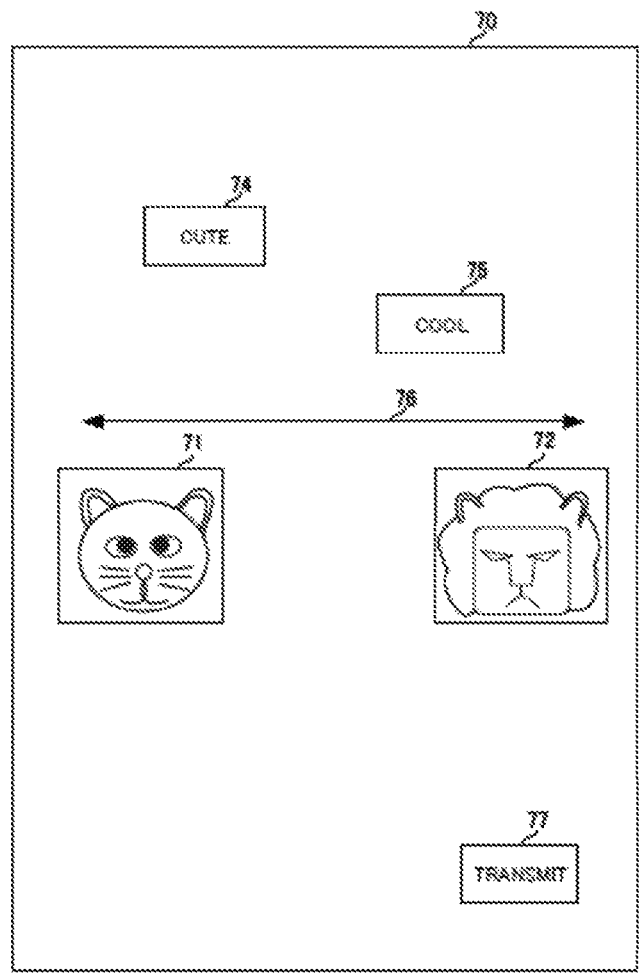
FIG. 12 shows an example of a screen of the game used in the third embodiment of the present invention.

FIG. 12 shows an example of a screen of the game used in the third embodiment of the present invention. In the example of FIG. 12, the display screen 70 displays the topic 71 and the topic 72 at opposing positions. The display screen 70 also displays the bar 76, which extends from the topic 71 to the topic 72 and has arrows at opposite ends, and the transmission button 77.

Unlike the examples of in FIGS. 9 to 11, in the example of FIG. 12, the player 200 drags each of the description 74 and the description 75 to a position that he/she thinks is appropriate between the topic 71 and the topic 72.

Thus, in the example of FIG. 12 also, a distance between a description and a topic is specified, and a reliability degree is calculated in accordance with the specified distance. Therefore, when the example of FIG. 12 is used, the advantageous effects that are similar to the advantageous effects achieved with the examples of FIGS, 9 to 11 can be achieved.

Although only the one-dimensional bar is displayed in all of the examples of FIGS. 9 to 11 and the example of FIG. 12, no limitation is intended regarding the dimensionality of the bar in the present third embodiment. For example, a two-dimensional bar may be used.

(Physical Configuration)

Figure 13:
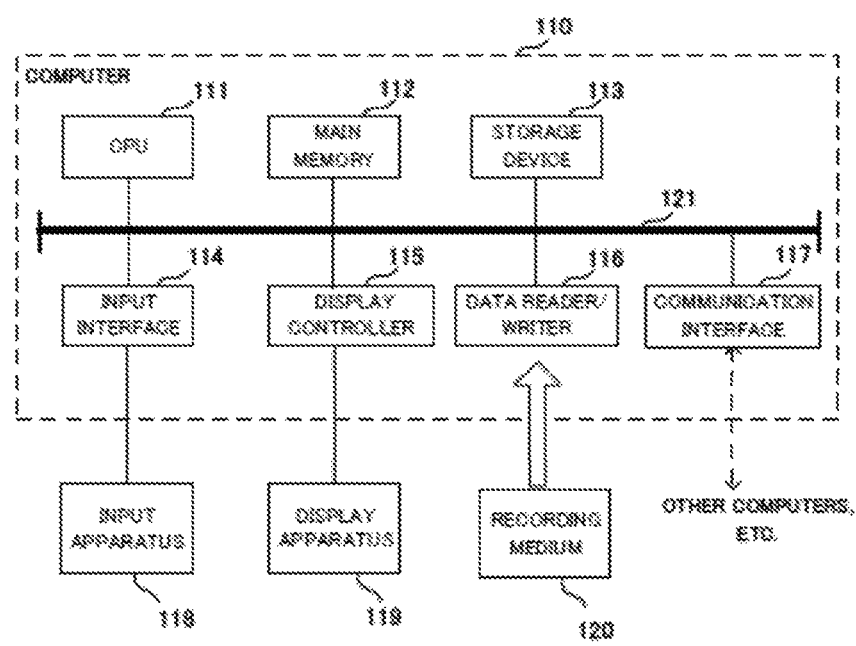
FIG. 13 is a block diagram showing an example of computers that realize the data collection device and the game device according to any one of the first to third embodiments of the present invention.

Using FIG. 13, the following describes a computer that realizes the game device by executing the first program according to any one of the first to third embodiments, and a computer that realizes the data collection device by executing the second program according to any one of the first to third embodiments. FIG. 13 is a block diagram showing an example of the computers that realize the data collection device and the game device according to any one of the first to third embodiments of the present invention.

As shown in FIG. 13, a computer 110 includes a CPU 111, a main memory 112, a storage device 113, an input interface 114, a display controller 115, a data reader/writer 116, and a communication interface 117. These components are connected in such a manner that they can perform data communication with one another via a bus 121.

The CPU 111 performs various types of calculation by deploying the programs (codes) according to the present embodiments stored in the storage device 113 to the main memory 112, and executing the deployed programs in a predetermined order. The main memory 112 is typically a volatile storage device, such as a dynamic random-access memory (DRAM). The programs according to the present embodiments are provided while being stored in a computer-readable recording medium 120. The programs according to the present embodiments may be distributed over the Internet connected via the communication interface 117.

Specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120. The data reader/writer 116 reads out the programs from the recording medium 120, and writes the result of processing of the computer 110 to the recording medium 120. The communication interface 117 mediates data transmission between the CPU 111 and other computers.

Specific examples of the recording medium 120 include: a general-purpose semiconductor storage device, such as CompactFlash® (CF) and Secure Digital (SD); a magnetic storage medium, such as a flexible disk; and an optical storage medium, such as a compact disc read-only memory (CD-ROM).

INDUSTRIAL APPLICABILITY

As described above, the present invention can reduce an input burden on a player when data is collected via a game on a network. The present invention is useful in a field that required data collection on a network.

REFERENCE SIGNS LIST 10 game device
11 operation accepting unit
12 program execution unit
13 information terminal
14 OS
15 input device
16 display device
20 data collection device
21 collection unit
22 data analysis unit
23 game providing unit
30 network
40, 50, 60, 70 display screen
41, 51, 61, 71, 72, 73 topic
42, 52, 62, 74, 75 description
43, 44, 45 region
46, 53, 63, 77 transmission button
100 data collection system
110 computer
111 CPU
112 main memory
113 storage device
114 input interface
115 display controller
116 data reader/writer
117 communication interface
118 input device
119 display device
120 recording medium
121 bus
200 player

The invention claimed is:

1. A data collection device, comprising:
a collection unit that collects game results from game devices that are each used by a different one of a plurality of players when the game devices of the plurality of players have executed a game that allows each player to associate a topic with a prepared description by performing an operation via a graphical interface;
a data analysis unit that applies statistical processing to the collected game results; and
a game providing unit that provides the game to each of the game devices of the plurality of players,
wherein in the statistical processing, the data analysis unit calculates a reliability degree that indicates, in the form of a numeric value, how reliably the description describes the topic based on the game results,
wherein the game providing unit provides, to game devices that are each used by the different one of two or more players, a game that allows each of the two or more players to select a description to be associated with the same topic from among a plurality of prepared descriptions by assigning ranks to the plurality of prepared descriptions,
wherein the data analysis unit calculates a reliability degree of the description by comparing one or more descriptions selected by the two or more players and the ranks assigned thereto, and
wherein the display screen of each game device is configured to display the status of the ranks changed by another player in silhouette.

2. The data collection device according to claim 1, wherein
the game providing unit provides a game that allows each player to select the description to be associated with the topic from among a plurality of prepared descriptions, and
the data analysis unit calculates the reliability degree of the description so that the larger number of times the description has been selected for the topic, the larger a value of the reliability degree.

3. The data collection device according to claim 1, wherein
the game providing unit provides a game that allows each player to position at least one of the topic and the description on a screen, and associate the topic with the description in accordance with a positional relationship between the positioned topic and description, and
the data analysis unit calculates the reliability degree in accordance with a distance between the topic and the description.

4. The data collection device according to claim 1, wherein
for each game device, the data analysis unit compares a game result from the game device with a game result from another game device, calculates a score that has a larger value as the former game result has more in common with the latter game result, and transmits the calculated score to the game device.

5. A data collection method, comprising:
a step (a) of, on a game device, accepting an operation performed by a player via a graphical interface;
a step (b) of, on the game device, executing a game program that, in response to the operation accepted in the step (a), associates a topic with one or all of two or more prepared descriptions;
a step (c) of, on a data collection device, collecting a game result from the game device;
a step (d) of, on the data collection device, applying statistical processing to the game result collected in step (c);
a step (e) of providing a game to each of game devices from the data collection device, the game devices each being used by a different one of a plurality of players,
wherein in the statistical processing executed in the step (d), a reliability degree that indicates, in the form of a numeric value, how reliably a description describes the topic is calculated based on the game result,
wherein in the step (e), to game devices that are each used by a different one of two or more players, a game that allows each of the two or more players to select a description to be associated with the same topic from among a plurality of prepared descriptions by assigning ranks to the plurality of prepared descriptions is provided, wherein in the step (d), a reliability degree of the description is calculated by comparing one or more descriptions selected by the two or more players and the ranks assigned thereto, and wherein the display screen of each game device is configured to display the status of the ranks changed by another player in silhouette.

6. The data collection method according to claim 5, wherein in the step (e), a game that allows each player to select a description to be associated with the topic from among a plurality of prepared descriptions is provided, and in the step (d), a reliability degree of the description is calculated so that the larger number of times the description has been selected for the topic, the larger a value of the reliability degree.

7. The data collection method according to claim 5, wherein in the step (e), a game that allows each player to position at least one of the topic and a description on a screen, and associate the topic with the description in accordance with a positional relationship between the positioned topic and description is provided, and in the step (d), a reliability degree is calculated in accordance with a distance between the topic and the description.

8. The data collection method according to claim 5, further comprising a step (f) of, on the data collection device, for each game device, comparing a game result from the game device with a game result from another game device, calculating a score that has a larger value as the former game result has more in common with the latter game result, and transmitting the calculated score to the game device.

9. A non-transitory computer readable medium having recorded therein a program including an instruction that causes a computer to execute:

a step (a) of collecting game results from game devices that are each used by a different one of a plurality of players when the game devices of the plurality of players have executed a game that allows each player to associate a topic with a prepared description by performing an operation via a graphical interface;

a step (b) of applying statistical processing to the game results collected in the step (a); and a step (c) of providing the game to each of the game devices of the plurality of players, wherein in the statistical processing executed in the step (b), a reliability degree that indicates, in the form of a numeric value, how reliably the description describes the topic is calculated based on the game results, wherein in the step (c), to game devices that are each used by a different one of two or more players, a game that allows each of the two or more players to select a description to be associated with the same topic from among a plurality of prepared descriptions by assigning ranks to the plurality of prepared descriptions is provided, wherein in the step (b), a reliability degree of the description is calculated by comparing one or more descriptions selected by the two or more players and the ranks assigned thereto, and wherein the display screen of each game device is configured to display the status of the ranks changed by another player in silhouette.

* * * * *

UNITED STATES PATENT AND TRADEMARK OFFICE
CERTIFICATE OF CORRECTION

PATENT NO. : 10,537,810 B2
APPLICATION NO. : 15/568010
DATED : January 21, 2020
INVENTOR(S) : Daishi Kato Page 1 of 2

It is certified that error appears in the above-identified patent and that said Letters Patent is hereby corrected as shown below:

In the Specification

Column 1, Cross Reference to Related Applications, Line 15; Delete "HELD" and insert --FIELD-- therefor Column 2, Disclosure of the Invention, Line 61; Delete "(h)" and insert --(b)-- therefor Column 4, Mode for Carrying Out the Invention, Line 53; Delete "Operation" and insert --operation-- therefor Column 4, Mode for Carrying Out the Invention, Line 56; Delete "e" and insert --the-- therefor Column 5, Mode for Carrying Out the Invention, Line 55; Delete "41," and insert --41.-- therefor Column 6, Mode for Carrying Out the Invention, Line 51; Delete "embodiment," and insert --embodiment.-- therefor Column 7, Mode for Carrying Out the Invention, Line 32; Delete "132)." and insert --B2).-- therefor Column 7, Mode for Carrying Out the Invention, Lines 56-57; Delete "BI to 133" and insert --B1 to B3-- therefor Column 8, Mode for Carrying Out the Invention, Line 9; Delete "forth," and insert --forth.-- therefor Column 8, Mode for Carrying Out the Invention, Line 62; Delete "62)," and insert --62).-- therefor Column 9, Mode for Carrying Out the Invention, Line 3; Delete "silhouette," and insert --silhouette.-- therefor Column 9, Mode for Carrying Out the Invention, Line 32; Delete "lamer" and insert --larger-- therefor Signed and Sealed this
Fifth Day of May, 2020

Andrei Iancu
*Director of the United States Patent and Trademark Office*

Column 9, Mode for Carrying Out the Invention, Line 50; Delete "in" and insert --In-- therefor Column 12, Mode for Carrying Out the Invention, Line 17; Delete "FIGS," and insert --FIGS.-- therefor